(No Model.) 2 Sheets—Sheet 1.

E. P. C. WEBSTER.
DEHORNING APPARATUS.

No. 425,478. Patented Apr. 15, 1890.

Witnesses.
Wm Rheem
Will R Omohundro

Inventor.
E. P. C. Webster
By Jno. G. Elliott
atty.

(No Model.) 2 Sheets—Sheet 2.
E. P. C. WEBSTER.
DEHORNING APPARATUS.
No. 425,478. Patented Apr. 15, 1890.
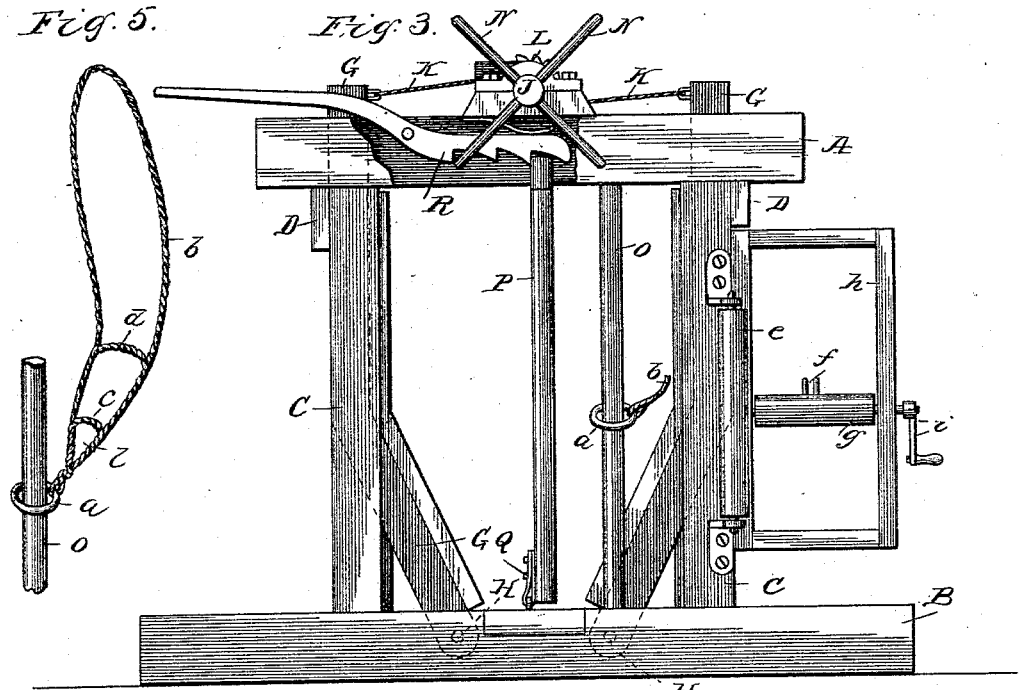
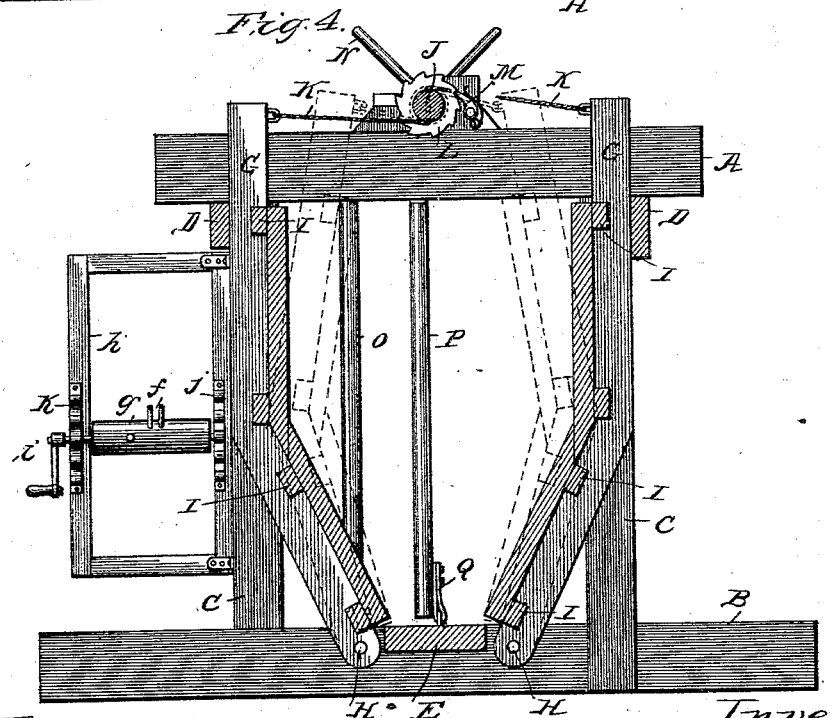
Witnesses.
Wm. R. Rheem
Will R. Dewhurst
Inventor.
E. P. C. Webster
By Jno. G. Elliott
Atty.

UNITED STATES PATENT OFFICE.

EBENEZER P. C. WEBSTER, OF MARYSVILLE, KANSAS.

DEHORNING APPARATUS.

SPECIFICATION forming part of Letters Patent No. 425,478, dated April 15, 1890.

Application filed May 22, 1888. Renewed August 21, 1889. Serial No. 321,457. (No model.)

*To all whom it may concern:*

Be it known that I, EBENEZER P. C. WEBSTER, a citizen of the United States, and a resident of Marysville, in the county of Marshall and State of Kansas, have invented certain new and useful Improvements in Dehorning Apparatus, of which the following is a specification.

This invention relates to improvements in dehorning apparatus for holding cattle during the operation of dehorning them and to prevent them from injuring themselves by falling down after their heads have been tied up in position for the dehorning operation.

The prime object of this invention is to have a chute for holding the animal not only against the possibility of falling or lying down, but also holding its head immovably in the most advantageous position for dehorning. Another object is to have the chute of such a character that animals of all sizes may be held thereby without alteration thereto and from which the animal may escape by walking out the front end after being dehorned instead of backing out, as has heretofore been necessary. A further object is to combine with such a chute a halter of peculiar form and a windlass, also attached to the chute, by means of which the animal's head may be immovably held at an angle to its body and in the best position for the successful performance of the dehorning operation. I attain these objects by the devices illustrated in the accompanying drawings, in which—

Figure 1:
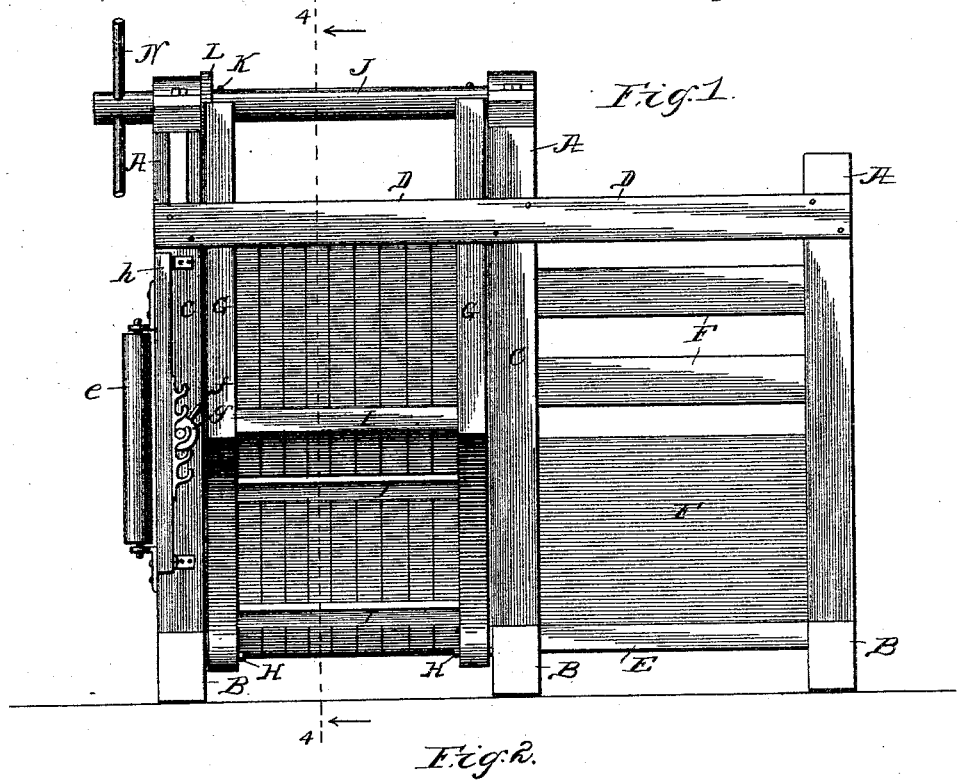
Figure 2:
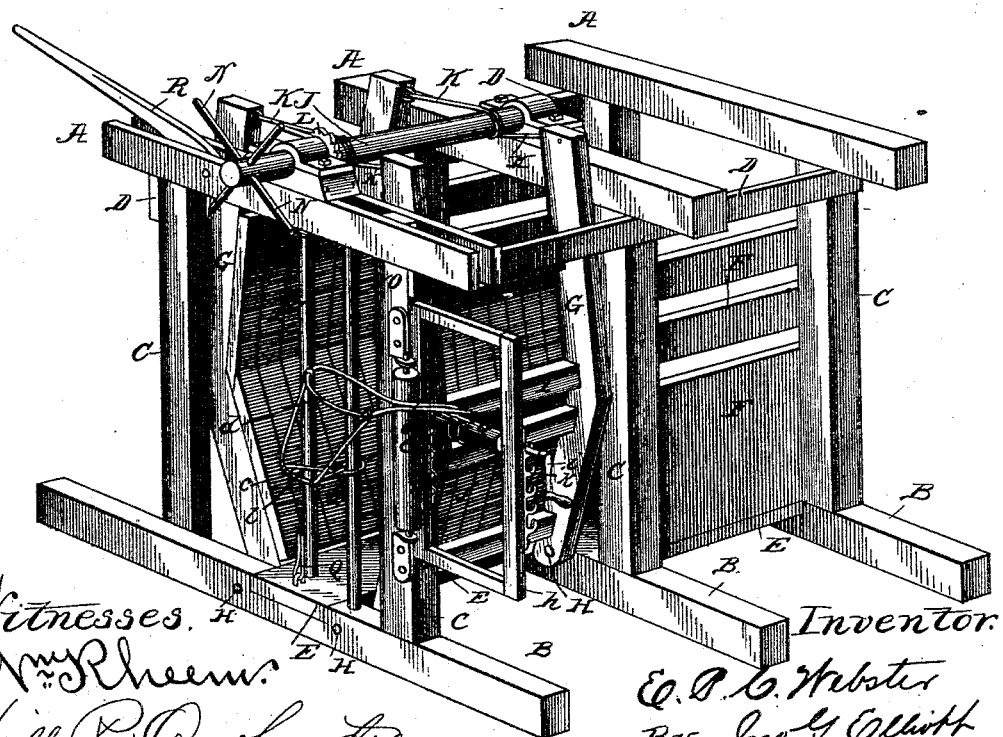

Figure 1 represents a side elevation of a dehorning apparatus embodying my invention; Fig. 2, a perspective view thereof; Fig. 3, a front elevation, parts being broken away; Fig. 4, a transverse vertical section on the line 4 4 of Fig. 1, looking in the direction indicated by the arrows; and Fig. 5, a detail perspective of a part of one of the stanchions, showing my halter attached thereto.

Similar letters of reference indicate the same parts in the several figures of the drawings.

Referring by letter to the accompanying drawings, A indicates the upper cross-timbers, B the lower cross-timbers, and C the vertical standards, of my chute, there being preferably three of each of the cross-bars and six of the standards, each pair of cross-bars being united by a pair of standards and the entire frame connected and held together by means of longitudinal side timbers D, attached to the standards, and the floor-board E, attached to the lower cross-bars, so that the whole constitutes the stationary frame of my chute, having a generally rectangular shape; but I may here state that the frame of the chute may be constructed in any convenient manner so long as it forms a support for the operative parts thereof, the main object being to provide a strong and simple structure in which to drive and hold the cattle. This chute is permanently boarded up between the two rear standards on each side thereof, as shown at F, so as to form a closed passage leading to the movable side portions of the chute in which the cattle are held during the operation of dehorning. These movable portions or wings consist of two pairs of vertical bars G, pivoted at their lower ends, as shown at H, to the front pair of the lower cross-bars and connected by short longitudinal bars I and boarded up between them, as shown, so as to form close frames occupying the entire space between the front and middle pair of standards. Below the center or about the lower line of the body of an ordinary-sized animal these movable sides incline inwardly toward each other— that is, toward the center of the chute—leaving a narrower space between the sides at the bottom or level with the floor E than at the top, the boards of these movable sides being preferably laid vertical, so as to prevent the animals catching their feet in the cracks thereof.

Journaled between the front and middle upper cross-bars, at the center of length thereof and extending longitudinally of the chute, is a shaft J, to which is secured, near the ends thereof, one end of ropes or cords K, the opposite ends of which are attached to the upper ends of the vertical bars G of the movable sides, while near one end of the shaft is mounted thereon a ratchet-wheel L, with which engages a spring-actuated pawl M, pivoted to a stationary portion of the frame, the forward end of said shaft being provided with radial spokes N, a pilot-wheel, crank-arm, or any other device by which said shaft may be rotated. By rotating this shaft the upper ends of the movable sides may be drawn toward each other, swinging on their pivots, as shown by dotted lines in Fig. 4 and in full lines in Fig. 2, and will be locked in any adjusted position by the spring-actuated pawl, which latter, however, may be disengaged and the parts returned to their normal position whenever it is desired to release the animal.

At the forward end of the machine, between the front pair of cross-bars, extend vertical stanchions O P, the one O being fixed and the one P hinged or pivotally connected at the lower end thereof, as shown at Q, to the lower cross-bar or floor of the chute, while the upper end thereof projects into an oblong groove in the upper cross-bar, where it engages one end of a notched lever or latch-bar R, pivoted in said cross-bar, the outer end of which projects beyond the cross-bar within easy reach of the operator, so that it may be depressed and the opposite end elevated, so as to release the end of the said stanchion and permit it to swing down on its pivot. The said latch-lever is spring actuated, so that the notched end thereof has always a tendency to remain in engagement with the end of the stanchion when elevated, and the notches or teeth therein are so inclined as to permit the insertion of the stanchion without manipulating the lever, but which will lock the stanchion in any position to which it is moved after being engaged thereby. It is between these stanchions that the neck of the animal is held during the operation of dehorning, the adjustability of one of the stanchions subserving the double purpose of enabling the adjustment to the necks of animals varying in thickness and its removal out of the path of the animal, so that the latter after being operated upon may pass out of the forward end of the chute instead of being backed out, as would otherwise be necessary, the said pivoted stanchion being preferably located in the center of the chute, while the fixed stanchion is located to one side thereof, and will therefore not interfere with the exit of the animal.

On the fixed stanchion is sleeved a ring $a$, free to slide up and down thereon, to which is secured one end of my improved halter, which consists of a looped rope or strap $b$, both ends of which are attached to said ring, and are connected near the ends thereof by the cross-pieces $c\ d$, the looped end of said halter being passed around a loose vertical roller $e$, journaled to one of the forward standards and hooked over pins $f$ or some projections upon a windlass $g$, journaled in a supplemental frame $h$, hinged to the said front standard, the journal of said windlass being provided at its outer end with a crank-handle $i$, by means of which the windlass is operated. This windlass is designed to be adjustable in its bearings, so as to operate on cattle of different heights, and for that reason the supplemental frame is provided at each side thereof with journal-plates $j\ k$ therefor, the former being provided with a vertical series of sockets into which the end of the journal of the windlass projects, while the latter is provided with a corresponding series of half-bearings or hooks into which the opposite end of the journal may be inserted without the necessity of removing the crank-handle. The nose of the animal is inserted into the space $l$, between the ends of the loop $b$ and the cross-piece $c$, while the cross-piece $d$ lies across the brow of the animal below the horns, the loop end being then brought across the top of the animal's head and caught on the hooks $f$ upon the windlass, and the slack in the loop taken up thereby, so as to draw the animal's head to one side and in a slightly-inclined position, as shown by the position of the halter in Fig. 2, in which position it is impossible for the animal to move its head, the windlass, ring, and the fixed stanchion serving to immovably hold him in the desired position. The supplemental frame, in which the windlass is journaled, is hinged to the standards in such manner that when not in use it may be folded back out of the way; but when thrown forward in position for use it will be as firmly held as if rigidly secured to the standard.

In the practical use of my apparatus the animal is driven into the chute from the rear end thereof, while the adjustable sides are extended in their normal position and the hinged stanchion drawn to one side, so as to permit the passage of the animal's head through the forward end of the apparatus, after which the stanchion is brought up into position and adjusted so as to fit the size of its neck and firmly locked in that position, after which, by means of the shaft J, the adjustable sides of the chute are brought together until they bear snugly against the sides of the animal, in which position they are likewise locked by the pawl and ratchet, as before described, after which the head of the animal is inserted into the halter and the looped end thereof attached to the windlass, when, by operating the latter, the animal's head will be drawn to one side and in a slightly-inclined position and there firmly held during the dehorning operation.

By the use of my chute not only is the animal prevented from injuring or in any manner interfering with the work of the operator, but it is so securely held in position that it cannot hurt itself by falling or being thrown down while its head is tied up in position for dehorning, which frequently happens with the old methods of securing the animal, and generally results in the permanent injury, if not death, of the animal by breaking its leg or neck. In conclusion, I may state that this chute is of a size which may be readily placed upon the body of a wagon for transportation; or the bottom cross-bars may be provided with axles for mounting the structure upon wheels, from which it may be removed when in operation, while still another, but not so convenient, construction might be formed by mortising and bolting the joints in such manner as to make the parts readily detachable and what is commonly known as a "knockdown frame."

Having described my invention, what I claim, and desire to secure by Letters Patent, is—

1. In a dehorning apparatus, the open-ended chute and the adjustable sides thereof, in combination with a fixed vertical stanchion in the forward end thereof to one side of the center, an opposing movable stanchion pivoted at its lower end to the center of the forward end of the chute, a socket for the upper end of said stanchion, and a notched lever for locking said end in the socket, whereby after the dehorning operation the movable stanchion may fall and an animal be permitted to pass out through the forward end of the chute, substantially as described.

2. In a dehorning apparatus, the open-ended chute and a pair of vertical stanchions at the forward end thereof, one of said stanchions being fixed and the other adjustable, in combination with a halter having a ring attached thereto and sliding upon the fixed stanchion, and a windlass, also secured to said chute to one side of the stanchions, upon which to wind the free end of said halter, whereby the animal's head may be firmly held at an angle to its body, substantially as and for the purpose described.

3. In a dehorning apparatus, the chute, the fixed stanchion O, and the adjustable hinged stanchion P, in combination with the halter having the ring $a$, loop $b$, and cross-pieces $c\,d$, substantially as described.

4. In a dehorning apparatus, the chute, the movable sides thereof pivoted at the lower edges to the chute, a shaft journaled in said chute above and midway between said sides, cross-pieces connecting the upper edges of said movable sides and the shaft, a ratchet-wheel mounted on said shaft, and a spring-actuated pawl engaging said wheel, in combination with a pair of stanchions at the forward end of said chute, one of said stanchions being fixed and the other adjustable, a halter attached to and sliding upon the fixed stanchion, and a windlass, also secured to said chute to one side of the stanchion, upon which to wind the free end of said halter, substantially as described.

5. In a dehorning apparatus, the chute, the hinged movable sides thereof, a shaft J, ropes K, connecting said sides and shaft, ratchet-wheel L upon the said shaft, pawl M, engaging said wheel, fixed stanchion O, an adjustable hinged stanchion P, and notched lever R, in combination with the halter having a ring $a$, sliding on a fixed stanchion, loop $b$, and cross-pieces $c\,d$, hinged frame $h$, adjustable windlass $g$, and journal-plates $j\,k$, and the roller $e$, secured to the chute-frame between said windlass and the stanchions, substantially as described.

EBENEZER P. C. WEBSTER.

Witnesses:
GEO. T. SMITH,
W. A. CALDERHEAD.